US010272824B2

(12) United States Patent
El Idrissi et al.

(10) Patent No.: US 10,272,824 B2
(45) Date of Patent: Apr. 30, 2019

(54) GENERATION AND REMOTE PROCESSING OF LIGHT MAPS

(71) Applicant: Valeo Vision, Bobigny (FR)

(72) Inventors: Hafid El Idrissi, Pantin (FR); Loic Boinet, Le Mesnil Esnard (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/046,748

(22) Filed: Feb. 18, 2016

(65) Prior Publication Data
US 2016/0243980 A1 Aug. 25, 2016

(30) Foreign Application Priority Data

Feb. 20, 2015 (FR) ...................... 1551472

(51) Int. Cl.
B60Q 1/14 (2006.01)
B60Q 11/00 (2006.01)
H04N 5/77 (2006.01)

(52) U.S. Cl.
CPC ........... *B60Q 1/1438* (2013.01); *B60Q 1/143* (2013.01); *B60Q 1/1423* (2013.01); *B60Q 11/005* (2013.01); *H04N 5/772* (2013.01); *B60Q 2300/112* (2013.01); *B60Q 2300/12* (2013.01); *B60Q 2300/146* (2013.01); *B60Q 2300/42* (2013.01); *B60Q 2300/45* (2013.01); *B60Q 2400/50* (2013.01)

(58) Field of Classification Search
CPC ........ B60Q 1/04; B60Q 1/085; B60Q 1/1423; B60Q 1/2603; B60Q 2300/10; B60Q 2300/30; B60Q 2300/31; F21V 14/00; F21V 14/06
See application file for complete search history.

(56) References Cited

U.S. PATENT DOCUMENTS

| 6,497,503 B1 * | 12/2002 | Dassanayake | B60Q 1/085 362/276 |
| 6,960,005 B2 | 11/2005 | Daicho et al. | |
| 7,156,542 B2 * | 1/2007 | Miller | B60Q 1/085 362/466 |
| 8,031,085 B1 * | 10/2011 | Anderson | B60Q 5/008 340/425.5 |

(Continued)

FOREIGN PATENT DOCUMENTS

DE 19911901 A1 10/2000
DE 102006059064 A1 6/2008
(Continued)

*Primary Examiner* — Tung X Le
*Assistant Examiner* — Henry Luong
(74) *Attorney, Agent, or Firm* — Oblon, McClelland, Maier & Neustadt, L.L.P.

(57) ABSTRACT

A lighting method comprising: definition, by a control system (CTRL_S) of a lighting device (HL), of a parameter (PAR) of the lighting device; transmission of this parameter, by the control system, to an actuator (LSS) of the lighting device; and generation, by the actuator, with a light source (LSR) of the lighting device, of a light beam producing an image corresponding to a light map obtained by modifying a light map stored in the actuator using the parameter received from the control system. The description also relates to a lighting device, a computer program and a storage medium for implementing such a method.

14 Claims, 2 Drawing Sheets

(56) References Cited

U.S. PATENT DOCUMENTS

Figure 1:
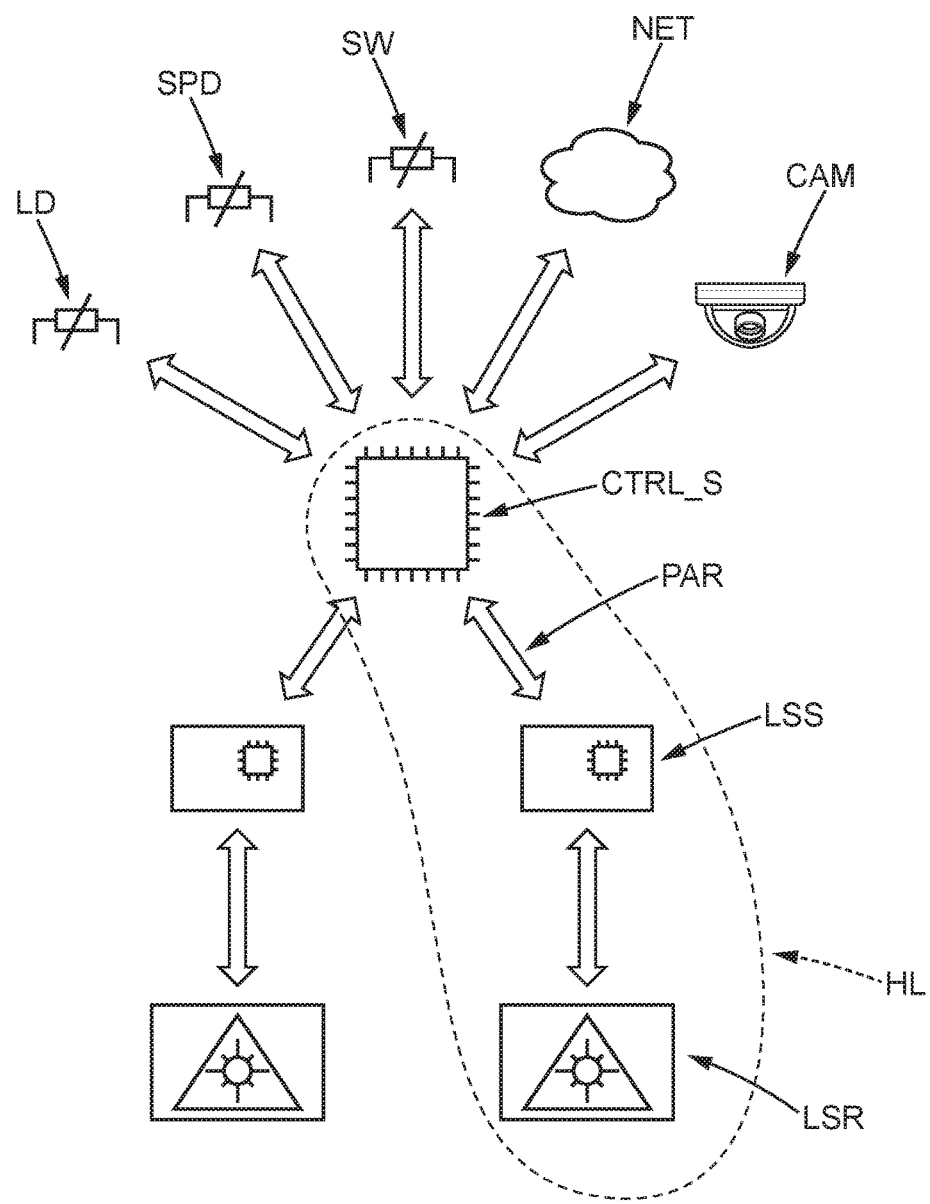

| | | | |
|---|---|---|---|
| 2002/0080617 A1* | 6/2002 | Niwa | B60Q 1/085 |
| | | | 362/465 |
| 2002/0196636 A1 | 12/2002 | Dassanayake et al. | |
| 2004/0052083 A1 | 3/2004 | Daicho et al. | |
| 2008/0084165 A1* | 4/2008 | Otsuka | B60Q 1/0023 |
| | | | 315/82 |
| 2011/0148301 A1* | 6/2011 | Schnerr | B60Q 11/005 |
| | | | 315/77 |
| 2012/0044090 A1 | 2/2012 | Kahler et al. | |
| 2013/0039080 A1* | 2/2013 | Yamazaki | B60Q 1/085 |
| | | | 362/465 |
| 2014/0029282 A1 | 1/2014 | Ravier et al. | |

FOREIGN PATENT DOCUMENTS

| | | |
|---|---|---|
| DE | 102008062640 A1 | 7/2009 |
| DE | 102013016904 A1 | 7/2014 |
| EP | 1707438 A1 | 10/2006 |
| EP | 1806531 A1 | 7/2007 |
| EP | 2690352 A1 | 1/2014 |

* cited by examiner

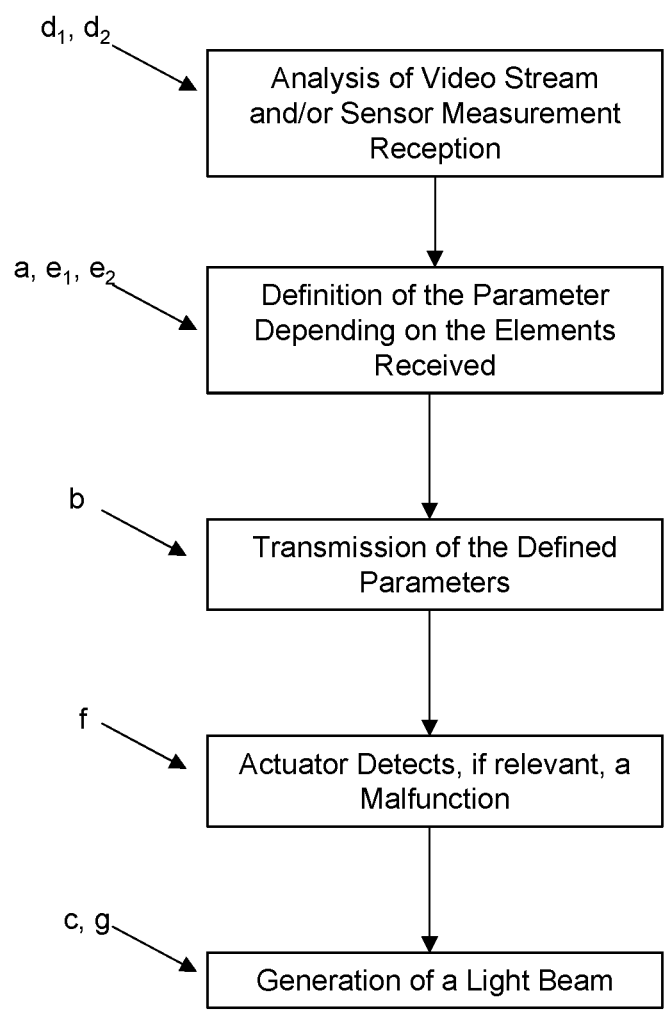

GENERATION AND REMOTE PROCESSING OF LIGHT MAPS

CROSS-REFERENCE TO RELATED APPLICATIONS

This application claims priority to the French application 1551472 filed Feb. 18, 2016, which application is incorporated herein by reference and made a part hereof.

BACKGROUND OF THE INVENTION

1. Field of the Invention

The invention relates to the field of lighting devices, in particular for automotive vehicles.

2. Description of the Related Art

It is necessary, in particular for nighttime driving, to provide the drivers of vehicles with lighting that matches as best as possible the traffic conditions, in order to decrease the risk of accidents. In particular, it is important for the driver to be able to have an optimal vision of the road lying in front of him and the sides of this road, without however dazzling other drivers or pedestrians.

Automotive vehicles include devices for lighting the road, which devices are used in case of insufficient visibility, for example in the evening, at night or during periods of bad weather. Conventionally, modern automotive vehicles are able to provide a number of types of lighting, and in particular:

what is called "high beam" lighting, produced by means of lighting devices that emit a light beam directed toward the horizon, and that lights the road scene integrally over a long distance of about 200 meters;

what is called "low beam" lighting, produced by means of low-beam or dipped lighting devices that emit a light beam bounded by an upper cut-off plane, inclined downward by about 15° to the horizontal, giving the driver a visibility over a distance of about 60 to 80 meters; the aim of this downward-sloping upper cut-off is to prevent other users present in the road scene extending in front of the vehicle, or on the sides of the road, from being dazzled; and what is called "fog" lighting, used in case of reduced visibility and produced by means of lighting devices that emit a beam of short range, of about 40 meters, which beam is limited toward the top by a cut-off plane but of substantial lateral spread, and does not emit upward rays liable to give rise to undesirable interactions with the droplets of fog, in order to allow the driver to take in his immediate environment.

The lighting devices just mentioned, and more particularly those that are used as low-beam lights, produce light beams that are perfectible when these headlamp devices are used under certain conditions. New functions, designated advanced functions and grouped under the acronym AFS (for advanced front lighting systems), which especially provide other types of beam, have therefore been developed. It is especially a question of:

a function called a BL (bending light) function, which may be decomposed into a function called a DBL (dynamic bending light) function and a function called an FBL (fixed bending light) function. These bending light functions are used when turning corners and are produced by means of headlamps that emit a light beam the horizontal orientation of which varies when the vehicle is following a curved path, so as to correctly illuminate the road sections that are going to be driven over by the vehicle and that are located, not on the axis of the vehicle, but in the direction that the vehicle is on the point of taking as a result of the angle transmitted to the steered wheels of the vehicle by its driver;

a function called a "town light" function; this function widens a low-beam light beam while slightly decreasing its range;

a function called a "motorway light" function. This function increases the range of a low-beam light while concentrating the light flux of the low-beam light on the optical axis of the headlamp device in question;

a function called an "overhead light" function; this function modifies a low-beam light beam so that sign gantries located above the road are illuminated satisfactorily by means of the low-beam lights; and a function called an AWL (adverse weather light) function; this function modifies a low-beam light beam such that the driver of a vehicle driving in the opposite direction is not dazzled by the reflection of the light from the headlamps on a wet road.

In addition, when the low-beam lighting is in operation the pitch angle of the vehicle may undergo relatively substantial variations, depending for example on the load of the vehicle and its acceleration or deceleration, which variations cause the inclination of the upper cut-off of the beam to vary, this causing other drivers to be dazzled if the cut-off is raised, or the road to be insufficiently lit if the cut-off is lowered. It is thus known to use a manually or automatically controlled range corrector to correct the orientation of the low-beam headlamps.

Excluding high-beam lighting, the other types of lighting, in which the light beam is sloped downwards, provide only reduced visibility to the driver of the vehicle, in front of the vehicle. These types of lighting are therefore often insufficient to allow the driver to perceive all of the road scene and anticipate possible obstacles or potentially dangerous situations.

To mitigate this drawback, light beam emitting lighting devices have been developed that provide the driver of the vehicle equipped with these lighting devices with lighting comparable to that of high-beam lighting, but in which zones of shadow are created in directions in which it is not desirable to emit light, for example in directions in which vehicles have been detected, in order not to dazzle drivers.

These light beams, known as "matrix beams" or "pixel lighting" depending on the technology used, require lighting devices of complex design, and very fine adjustments to obtain the desired result, i.e. zones of shadow both the size and direction of which are variable.

Conversely, it is known to provide a lighting beam in which zones of the road scene containing notable details are illuminated with a higher light intensity than the environment of these details, in order to especially draw the attention of the driver of the vehicle to the latter.

It is thus known to integrate into a lighting device a digitized matrix-array projecting system. It is thus possible, for example via information-processing means, to project any image. This especially makes it possible to suppress the light beam emitted by the lighting device from subportions that would have the effect of dazzling people located in the field of projection of the lighting device (pedestrian, driver of a vehicle approaching in the opposite direction, etc.) but also to add information (notable details, etc.).

Controlling a digitized matrix-array projecting system requires a large amount of information. It is especially necessary to provide a complete light map. By light map what is meant is all the points (pixels) describing the projected image, which map may take the form of an electronic file comprising an image.

In a vehicle, lighting is conventionally managed by a central control system, thereby requiring a substantial stream of data to be transmitted between this central control system and the actuators of the lighting devices.

U.S. 2002/0196636 A1, which issued as U.S. Pat. No. 6,497,503 (Dassanayake et al.), describes a static projecting system that stores each light map liable to be projected. This lacks flexibility (no provision is made for context-dependent dynamic light-map modification) and requires a lot of memory.

U.S. 2012/0044090 A1, DE102006059064A1, EP1707438A1, EP1806531A1, EP2690352A1, which is equivalent to U.S. 2014/0029282 or even U.S. 2004/0052083 A1, which issued as U.S. Pat. No. 6,960,005, describes projecting systems that also lack flexibility and/or require lots of memory or bandwidth. In particular, the transmission of videos over a bus of a vehicle is liable to saturate this bus, and to not leave enough bandwidth available for other applications.

SUMMARY OF THE INVENTION

The invention therefore aims to improve the situation.

One aspect of the invention relates to a lighting method implemented by a lighting device comprising:
an actuator storing two light maps;
a control system; and
a light source,
the method comprising:
a) definition, by the control system, of a parameter of the lighting device;
b) transmission of this parameter by the control system to the actuator;
c) generation, by the actuator, with the light source, of a light beam producing an image corresponding to a light map obtained by modifying a light map stored in the actuator using the parameter received from the control system.

This method is advantageous especially in that only one parameter (as opposed to all the information required to define this parameter) is transmitted, thereby saving bandwidth between the control system and the actuator. Moreover, the processing required at the actuator level is decreased because a pre-calculated light map is stored therein, and only a modification thereof is performed (as opposed to a complete light-map calculation). This makes it possible to perform the processing in real-time at the actuator level, without requiring very powerful components. Lastly, the parameter allows the light map to be adapted dynamically, without being limited to a fixed set of stored light maps.

Another aspect of the invention relates to a computer program comprising a set of instructions that, when they are executed by a processor, lead the processor to implement a method according to the aforementioned aspect of the invention.

Another aspect of the invention relates to a non-transient computer-readable storage medium, the medium storing a computer program according to the aforementioned aspect of the invention.

Another aspect of the invention relates to a lighting device, comprising:
an actuator storing two light maps;
a control system arranged to define a parameter of the lighting device and to transmit this parameter to the actuator; and
a light source,
the actuator being arranged to generate, with the light source, a light beam producing an image corresponding to a light map obtained by modifying a light map stored in the actuator using the parameter.

The advantages of the aforementioned lighting method apply to this lighting device.

These and other objects and advantages of the invention will be apparent from the following description, the accompanying drawings and the appended claims.

Other aspects, aims and advantages of the invention will become apparent on reading the description of a few of its embodiments.

BRIEF DESCRIPTION OF THE ACCOMPANYING DRAWINGS

The invention will also be better understood by virtue of the drawings, in which:

FIG. 1 schematically illustrates a lighting device according to one possible embodiment of the invention; and FIG. 2 schematically illustrates a lighting method according to one possible embodiment of the invention.

DETAILED DESCRIPTION OF THE PREFERRED EMBODIMENTS

According to a first embodiment, a lighting method is implemented by a lighting device HL (for headlamp), for example an automobile headlamp.

The lighting device comprises an actuator storing at least two light maps (nothing prevents it from storing more thereof). This actuator is for example a laser scanning system LSS, as schematically shown in FIG. 1. Such a system is described in patent application EP2690352A1, which is equivalent to U.S. 2014/0029282, of the same Applicant. A laser may thus illuminate a rotating mirror that, depending on the commands received, strikes a block of luminescent material, also denoted a light converter, and usually designated by the generic term phosphor, in various locations. It is this light converter, which comprises at least one luminescent material designed to at least partially absorb at least one exciting wavelength emitted by a light source and to convert at least some of the absorbed exciting light into a light emission having a wavelength different from that of the exciting light, which shines under the effect of the laser and which creates the light beam finally emitted.

However, the actuator LSS may also be a system controlling a matrix-array of LEDs (light-emitting diodes). Various technologies thus allow any given image to be projected.

The lighting device may obviously comprise a plurality of actuators LSS.

The at least two light maps stored in the actuator LSS advantageously undergo processing beforehand in order to decrease the subsequent real-time processing.

A first light map is for example a "conventional" light map, such as an LB (low-beam) light map, at the actuator level. This makes it possible to provide a safe mode in case of malfunction (for example in case of loss of communication between the control system CTRL_S and the actuator LSS), as will be explained below.

A second light map is for example an unconventional light map on the basis of which it is easy to model a large number of light maps, using masks that the actuator LSS applies directly to this light map depending on parameters transmitted by the control system CTRL_S. Advantageously, it is a question of a light map corresponding to a high-beam light.

Thus, a single data stream is transmitted instead of sending image information that would require much more complicated and expensive means.

Other light maps may be stored in the actuator LSS, for example in order to accommodate driving on the right or left, or to provide a welcome scenario when the vehicle is opened, with for example projection of the logo of the manufacturer of the vehicle or a personalized welcome message.

It will be understood that the main advantage of the invention is that, with only two stored light maps, it is possible to produce all the desired light beams, with very few memory storage resources and little consumption of bandwidth. Thus, in the specific case of adaptation of the low-beam light to driving on the left or right, the first low-beam LB light map, which includes an inclined cut-off corresponding to a given driving side, for example the right-hand side, allows a low-beam light beam that is suitable for the other driving side to be generated by simply projecting a mirror image of the stored first LB light map.

In the context of the invention, the actuator LSS will possibly store 2 to 10 different light maps. Preferably, the actuator LSS stores up to 5 light maps, limiting value included. More preferably, the actuator LSS stores two or three light maps and even more preferably, the actuator LSS stores two light maps.

The actuator LSS comprises an electronic circuit (such as an assembly comprising a microprocessor and a memory storing a suitable computer program, or even a purpose-built electronic circuit such as an FPGA). This electronic circuit allows the actuator LSS to be controlled (for example by defining a suitable scan of a laser beam, or by suitably controlling the turn on of diodes of a matrix-array of diodes).

The lighting device comprises a control system CTRL_S. This control system CTRL_S is an electronic circuit, for example an assembly comprising a microprocessor and a memory storing a suitable computer program. Alternatively, this control system CTRL_S is for example a purpose-built electronic circuit such as an FPGA.

The lighting device comprises a (or more than one) light source, such as a laser LSR, or even a matrix array of diodes.

The lighting method comprises definition a, by the control system CTRL_S, of a parameter PAR of the lighting device HL. Nothing prevents the parameter PAR from comprising a plurality of sub-parameters. According to one possible implementation, this definition results from the processing of a certain number of input data. The control system CTRL_S thus unburdens the actuator LSS of all these processing operations (thus requiring only a lower processing power in the actuator LSS) and decreases the bandwidth required between the control system CTRL_S and the actuator LSS (only the parameter PAR, and not all the input data, being transmitted).

The lighting method comprises transmission b of this parameter PAR by the control system CTRL_S to the actuator LSS.

The lighting method comprises generation c, by the actuator LSS, with the light source, of a light beam producing an image corresponding to a light map obtained by modifying a light map stored in the actuator LSS using the parameter PAR received from the control system CTRL_S.

The method may thus modulate the intensity of the laser in order not to illuminate certain zones. It may also, in the context of use of a matrix array of LEDs, command the gradual turnoff of the LEDs at the exit of a tunnel, etc.

It is thus possible to limit the real-time processing to only dynamic functionalities (identified by the received parameters), the majority of the stored light maps not being affected.

According to a second embodiment, a lighting method according to the first embodiment comprises an analysis d1, by the control system CTRL_S, of a video stream captured by a video camera CAM connected to the control system CTRL_S. The control system CTRL_S may thus seek to identify, in the scene filmed by the video camera CAM, any vehicles approaching from in front (for example by detecting their turned-on headlamps), or even pedestrians.

The lighting method comprises definition e1, by the control system CTRL_S, of the parameter PAR depending on the result of this analysis. The parameter PAR may thus consist of a mask. This mask, transmitted to the actuator LSS, allows it for example to mask a portion of the light map that would risk dazzling vehicles approaching from in front. The actuator LSS may thus, from a stored image file (containing a light map) generate another image file (light map modified by adding a mask).

A mask also allows, according to one possible implementation, relevant information to be embedded in the image. For example, when the navigation of the vehicle is assisted by a global positioning system such as GPS, the mask may be used to make an extra bright arrow (or other types of information) appear on the road indicating the direction to follow. The parameter PAR then depends not only on the image captured by the video camera CAM but also on other data (information originating from a GPS).

This second embodiment makes it possible to avoid transmitting a broadband video stream, and instead to transmit simple parameters requiring only a narrow band.

By broadband, what is meant is a bandwidth of about an order of magnitude of at least ten times higher than a narrowband (in theory, the notions of broad and narrow band may vary, and hence the relative definition of these notions).

According to a third embodiment, the lighting device HL according to the first or second embodiment comprises reception d2, by the control system CTRL_S, of a measurement carried out by a sensor connected to the control system CTRL_S. The sensor is for example a SW (steering wheel) sensor connected to a steering wheel and measuring the rotation thereof, or a LD (load) sensor measuring the load of the vehicle, or an SPD (speed) sensor measuring the speed of the vehicle. The sensor may consist of a combination of sensors and return a combination of information (each piece of information being issued from each sensor of the combination, respectively).

The lighting method comprises definition e2, by the control system CTRL_S, of the parameter PAR depending on this received measurement. For example, a measurement of cornering to the left (to the right, respectively) via the SW sensor may be translated into the parameter PAR indicating a horizontal translation to the left (to the right, respectively) of the light map so that the lighting device HL continues to light the road despite the corner (and not the roadside to the right or left, respectively). Likewise, a distribution of the load measured by the LD sensor or a measurement of acceleration or deceleration taken by virtue of the SPD sensor makes it possible to indicate a change in the pitch angle of the vehicle and this may be taken into account by defining the parameter PAR specifying an upward or downward translation of the light map (so as to compensate for the pitch angle).

The parameter PAR may incorporate sub-parameters issued from various sensors (such as the aforementioned sensors SW, SPD and LD) and sub-parameters issued from an analysis of an image taken by the video camera CAM (as indicated in the aforementioned second embodiment), and yet other sub-parameters.

According to a fourth embodiment, the lighting device HL according to one of the preceding embodiments comprises detection f, by the actuator LSS, of a possible malfunction in the lighting device HL.

The actuator LSS may thus comprise an error detecting electronic circuit that is for example an assembly comprising a microprocessor and a memory storing a suitable computer program. Alternatively, this error detecting electronic circuit is for example a purpose-built electronic circuit such as an FPGA. This circuit for example makes it possible to detect whether the parameters PAR received from the control system CTRL_S are inconsistent, or even whether the connection with the control system CTRL_S is no longer reliable.

The lighting method comprises, in case of detection of a malfunction, generation g, by the actuator LSS, of a light beam producing an image corresponding to a light map stored in the actuator LSS. It is preferably a question of a light map corresponding to the dipped function, without corrections. Thus, dazzle of other users is avoided, but (realistically) at the price of suboptimal lighting.

According to a fifth embodiment, a computer program comprises a set of instructions that, when they are executed by a processor, lead the processor to implement a method according to one of the preceding embodiments. This computer program may for example be written in a high-level language such as the language C or in a lower level language such as an assembly language.

According to a sixth embodiment, a non-transient computer-readable storage medium stores a computer program according to the fifth embodiment. This storage medium is for example a memory of the lighting device HL, such as a nonvolatile memory (EEPROM, ROM, Flash, etc.).

According to a seventh embodiment, the lighting device HL comprises the actuator LSS storing two light maps.

The lighting device HL comprises the control system CTRL_S arranged to define the parameter PAR of the lighting device HL and to transmit this parameter PAR to the actuator LSS.

The lighting device HL comprises the light source LSR.

The actuator LSS is arranged to generate, with the light source LSR, a light beam producing an image corresponding to a light map obtained by modifying a light map stored in the actuator LSS using the parameter PAR.

According to an eighth embodiment, the control system CTRL_S of the lighting device HL according to the seventh embodiment is arranged to analyze a video stream captured by the video camera CAM connected to the control system CTRL_S and to define the parameter PAR depending on the result of this analysis.

According to a ninth embodiment, the control system CTRL_S of the lighting device HL according to the seventh or eighth embodiment is arranged to define the parameter PAR depending on a measurement taken by the SW, LD or SPD sensor connected to the control system CTRL_S.

According to a tenth embodiment, the actuator LSS of the lighting device HL according to one of the seventh to ninth embodiments is arranged to detect a possible malfunction in the lighting device HL, and to generate, when it detects such a malfunction, a light beam producing an image corresponding to a light map stored in the actuator LSS.

FIG. 1 schematically shows the lighting device HL according to one possible embodiment. This lighting device HL (an assembly of two automobile headlamps) comprises the control system CTRL_S, which in the present case is shared by the two headlamps. This sharing allows the processing power to be mutualized. The lighting device comprises two identical actuators LSS associated with the front left headlamp and the HL front right headlamp of an automobile, respectively. The lighting device HL comprises two identical light sources (two lasers LSR, one for the left headlamp and one for the right headlamp).

The lighting device HL is connected to the (single) video camera CAM (shared by the two headlamps), which is arranged to measure the field in front of the vehicle in order to detect bright spots and depending on these bright spots determine where there are vehicles not to be dazzled. Each actuator LSS may deduce its own visual field by a change of frame of reference relative to the measurement of the video camera CAM (this also avoids the need for a dual-camera). However, it is also possible to provide as many cameras as there are headlamps.

Each headlamp comprises, as is conventional, its own optical module (not shown) allowing its light beam to be adapted.

The lighting device HL is also connected to the sensor SW, to the sensor LD and to the sensor SPD, and to an automobile network NET. The control system CTRL_S is arranged to analyze the information issued from these various sensors and from the video camera CAM in order to generate the parameter PAR transmitted to the respective actuator LSS.

FIG. 2 schematically shows various steps of a method according to one embodiment. The method starts with a step d1 (video stream analysis) and/or d2 (sensor measurement reception). The method continues (steps a, e1, and/or e2) with the definition of the parameter PAR depending on the elements received beforehand (step d1/d2). Next comes the step b of transmission of the defined parameter(s) PAR. Next, in a step f, the actuator LSS detects, if relevant, a malfunction. In the following step, if no malfunction was detected, the step c (generation, by the actuator LSS, with the light source (LSR), of a light beam dependent on the parameter PAR) may be implemented, if not it is a default light map that is selected for safety's sake (dipped function for example).

Of course, the present invention is not limited to the embodiments described above by way of example; it extends to other variants. In particular, the lighting device HL may be used by any type of vehicle, including motorcycles, aircraft or even ships. Moreover, the embodiments relating to the methods are transposable to the devices and vice versa.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting method implemented by a lighting device comprising:
   a digitized matrix-array of light sources;
   an actuator storing a plurality of light maps to control all points on the digitized matrix-array, each of the plurality of light maps defined by an image file; and
   a control system,
   said lighting method comprising:

definition, by said control system, of a parameter of said lighting device;
transmission of said parameter by said control system to said actuator;
generation, by said actuator, with a light source, of a light beam producing an image corresponding to a light map obtained by modifying said each of the plurality of light maps stored in said actuator using said parameter received from said control system;
analysis, by said control system, of a video stream captured by a video camera connected to said control system; and
definition, by said control system, of said parameter depending on the result of said analysis.

2. The lighting method according to claim 1, comprising:
reception, by said control system, of a measurement taken by a sensor connected to said control system; and
definition, by said control system, of said parameter depending on said measurement.

3. The lighting method according to claim 2, comprising:
detection, by said actuator, of a possible malfunction in said lighting device;
in case of detection of a malfunction, generation, by said actuator, of a light beam producing an image corresponding to a light map stored in said actuator.

4. A non-transitory computer-readable storage medium comprising a set of instructions that, when they are executed by a processor, lead said processor to implement the lighting method according to claim 2.

5. A non-transitory computer-readable storage medium comprising a set of instructions that, when they are executed by a processor, lead said processor to implement the lighting method according to claim 1.

6. The lighting method according to claim 1, comprising:
detection, by said actuator, of a possible malfunction in said lighting device;
in case of detection of said possible malfunction, generation, by said actuator, of a light beam producing an image corresponding to a light map stored in said actuator.

7. The lighting method according to claim 1, wherein the parameter is a mask to mask a portion in one of the plurality of the light maps.

8. The lighting method according to claim 7, wherein an image formed by the mask is embedded with navigation information.

9. A lighting device, comprising:
a digitized matrix-array of light sources;
an actuator storing a plurality of light maps to control all points on the digitized matrix-array, each of the plurality of light maps defined by an image file; and
a control system arranged to define a parameter of said lighting device and to transmit said parameter to said actuator,
said actuator being arranged to generate, with a light source, a light beam producing an image corresponding to a light map obtained by modifying a light map stored in said actuator using said parameter;
said actuator being arranged to detect a possible malfunction in said lighting device, and to generate, when it detects such said possible malfunction, said light beam producing said image corresponding to said light map stored in said actuator, and
said control system being arranged to analyze a video stream captured by a video camera connected to said control system and to define said parameter depending on the result of this analysis.

10. The lighting device according to claim 9, said control system being arranged to define said parameter depending on a measurement taken by a sensor connected to said control system.

11. A non-transitory computer-readable storage medium comprising a set of instructions that, when they are executed by a processor, lead said processor to operate the lighting device according to claim 9.

12. The lighting device according to claim 9, wherein the parameter is a mask to mask a portion in one of the plurality of the light maps.

13. The lighting device according to claim 12, wherein an image formed by the mask is embedded with navigation information.

14. A lighting method implemented by a lighting device comprising:
a digitized matrix-array of light sources;
an actuator storing a plurality of light maps to control all points on the digitized matrix-array, each of the plurality of light maps defined by an image file; and
a control system,
said lighting method comprising:
definition, by said control system, of a parameter of said lighting device;
transmission of said parameter by said control system to said actuator;
generation, by said actuator, with a light source, of a light beam producing an image corresponding to a light map obtained by modifying a light map stored in said actuator using said parameter received from said control system,
reception, by said control system, of a measurement taken by a sensor connected to said control system; and
definition, by said control system, of said parameter depending on said measurement,
wherein the sensor measures rotation of a steering wheel or a load of a vehicle.

* * * * *